United States Patent
Price et al.

(10) Patent No.: US 11,560,477 B2
(45) Date of Patent: *Jan. 24, 2023

(54) MATERIAL AND METHOD FOR POWDER BED FUSION

(71) Applicant: SHPP GLOBAL TECHNOLOBIES B.V., Bergen op Zoom (NL)

(72) Inventors: Brian Price, Evansville, IN (US); Bruke Jofore, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/624,933

(22) PCT Filed: Jul. 29, 2020

(86) PCT No.: PCT/US2020/044018
§ 371 (c)(1),
(2) Date: Jan. 5, 2022

(87) PCT Pub. No.: WO2021/021897
PCT Pub. Date: Feb. 4, 2021

(65) Prior Publication Data
US 2022/0204758 A1 Jun. 30, 2022

Related U.S. Application Data

(60) Provisional application No. 62/880,722, filed on Jul. 31, 2019.

(51) Int. Cl.
| | |
|---|---|
| C08L 69/00 | (2006.01) |
| B33Y 10/00 | (2015.01) |
| B33Y 70/00 | (2020.01) |
| B29C 64/153 | (2017.01) |
| C08L 79/08 | (2006.01) |
| C09D 5/03 | (2006.01) |
| C09D 169/00 | (2006.01) |
| C09D 179/08 | (2006.01) |
| B29K 69/00 | (2006.01) |
| B29K 79/00 | (2006.01) |

(52) U.S. Cl.
CPC ............ *C08L 69/00* (2013.01); *B29C 64/153* (2017.08); *B33Y 10/00* (2014.12); *B33Y 70/00* (2014.12); *C08L 79/08* (2013.01); *C09D 5/031* (2013.01); *C09D 169/00* (2013.01); *C09D 179/08* (2013.01); *B29K 2069/00* (2013.01); *B29K 2079/085* (2013.01)

(58) Field of Classification Search
None
See application file for complete search history.

(56) References Cited

U.S. PATENT DOCUMENTS

| | | | |
|---|---|---|---|
| 386,504 | A | 7/1888 | Sweanor |
| 3,158,472 | A | 11/1964 | Von Bogdandy et al. |
| 3,847,867 | A | 11/1974 | Heath et al. |
| 3,850,885 | A | 11/1974 | Takekoshi et al. |
| 3,852,242 | A | 12/1974 | White |
| 3,855,178 | A | 12/1974 | White et al. |
| 3,983,093 | A | 9/1976 | Williams, III et al. |
| 4,147,742 | A | 4/1979 | Castro et al. |
| 4,443,591 | A | 4/1984 | Schmidt et al. |
| 5,185,108 | A | 2/1993 | Shimandle |
| 5,342,919 | A | 8/1994 | Dickens, Jr. et al. |
| 5,344,910 | A | 9/1994 | Sybert |
| 5,648,450 | A | 7/1997 | Dickens, Jr. et al. |
| 6,194,497 | B1 | 2/2001 | Willems et al. |
| 6,914,092 | B1 | 7/2005 | Dobler et al. |
| 7,084,232 | B2 | 8/2006 | Kim et al. |
| 7,341,784 | B2 | 3/2008 | Yeung et al. |
| 8,709,330 | B2 | 4/2014 | Huskamp et al. |
| 2011/0129682 | A1 | 6/2011 | Kurata et al. |
| 2017/0028632 | A1 | 2/2017 | Cox et al. |
| 2017/0075245 | A1 | 3/2017 | Orrock et al. |
| 2018/0178413 | A1 | 6/2018 | Kalyanaraman et al. |
| 2018/0244862 | A1 | 8/2018 | Price |
| 2018/0244863 | A1 | 8/2018 | Leenders |

(Continued)

FOREIGN PATENT DOCUMENTS

| | | |
|---|---|---|
| CN | 1942522 A | 4/2007 |
| CN | 109796742 A | 5/2019 |

(Continued)

OTHER PUBLICATIONS

Ma, et al., "Effect of particle size distribution on sintering of agglomerate-free submicron alumina powder compacts", Journal of the European Ceramic Society 22 (2002) 2197-2208.

(Continued)

*Primary Examiner* — Robert T Butcher
(74) *Attorney, Agent, or Firm* — Cantor Colburn LLP

(57) ABSTRACT

A particulate material useful for additive manufacturing contains a semicrystalline polycarbonate or a semicrystalline polyetherimide. The particles of the particulate material are characterized by a narrow volume-based distribution of equivalent spherical diameters in which the median equivalent spherical diameter (Dv50) M is in the range 35 to 85 micrometers, the equivalent spherical diameter corresponding to 1 percent of the cumulative undersize distribution (Dv01) is greater than 2 micrometers, and the equivalent spherical diameter corresponding to 99 percent of the cumulative undersize distribution (Dv99) is less than 115 micrometers. Also described is a method of additive manufacturing utilizing the particulate material.

15 Claims, 1 Drawing Sheet

(56) References Cited

U.S. PATENT DOCUMENTS

| | | |
|---|---|---|
| 2018/0273699 A1 | 9/2018 | Kalyanaraman |
| 2018/0273707 A1 | 9/2018 | Price |
| 2019/0143582 A1 | 5/2019 | Hungerland et al. |
| 2019/0248964 A1 | 8/2019 | Kalyanaraman et al. |
| 2022/0204759 A1 | 6/2022 | Jofore et al. |

FOREIGN PATENT DOCUMENTS

| | | |
|---|---|---|
| GB | 2258173 A | 2/1993 |
| JP | 2001031856 A | 2/2001 |
| JP | 2003105186 A | 4/2003 |
| WO | 2006052522 A2 | 5/2006 |
| WO | 2015048735 A1 | 4/2015 |
| WO | 2016134224 A1 | 8/2016 |
| WO | 2017033146 A1 | 3/2017 |
| WO | 2017040887 A1 | 3/2017 |
| WO | 2017040893 A1 | 3/2017 |
| WO | 2018071578 A1 | 4/2018 |
| WO | 2018119409 A1 | 6/2018 |
| WO | 2018129527 A2 | 7/2018 |
| WO | 2019058332 A1 | 3/2019 |

OTHER PUBLICATIONS

Non-Final Office Action dated Apr. 28, 2022; U.S. Appl. No. 17/624,947, filed Jan. 5, 2022 (8 pages).

Bjork, et al., "The effect of particle size distributions on the microstructural evolution during sintering" Journal of the American Ceramic Society, vol. 96, (1), 2013, 103-110.

Hsieh et al., "Transient crystallization of an aromatic polyetherimide: effect of annealing" Polymer, 1992, vol. 33, No. 2, pp. 306-313.

International Search Report dated Oct. 7, 2020; International Application No. PCT/US2020/044017; International Filing Date Jul. 29, 2020 (5 pgs).

International Search Report dated Oct. 9, 2020; International Application No. PCT/US2020/044018; International Filing Date Jul. 29, 2020 (5 pgs).

Kloos, et al., "Production of spherical semi-crystalline polycarbonate microparticles for Additive Manufacturing by liquid-liquid phase separation", Powder Technology 335 (2018) 275-284.

Lexow et al., "New Matierials for SLS: The Use of Antistatic and Flow Agents", Journal of Powder Technology, vol. 2016, Article IDS 4101089 (9 pages).

Sofia, et al., "Selective laser sintering of ceramic powders with bimodal particle size distribution" Chemical Engineering Research and Design, vol. I, No. 36, (2018), 536-547.

Written Opinion dated Oct. 7, 2020; International Application No. PCT/US2020/044017; International Filing Date Jul. 29, 2020 (6 pgs).

Written Opinion dated Oct. 9, 2020; International Application No. PCT/US2020/044018; International Filing Date Jul. 29, 2020 (8 pgs).

Final Office Action dated Aug. 17, 2022; U.S. Appl. No. 17/624,947, filed Jan. 5, 2022 (10 pgs).

Notice of Allowance dated Sep. 14, 2022; U.S. Appl. No. 17/624,947, filed Jan. 5, 2022 (9 pages).

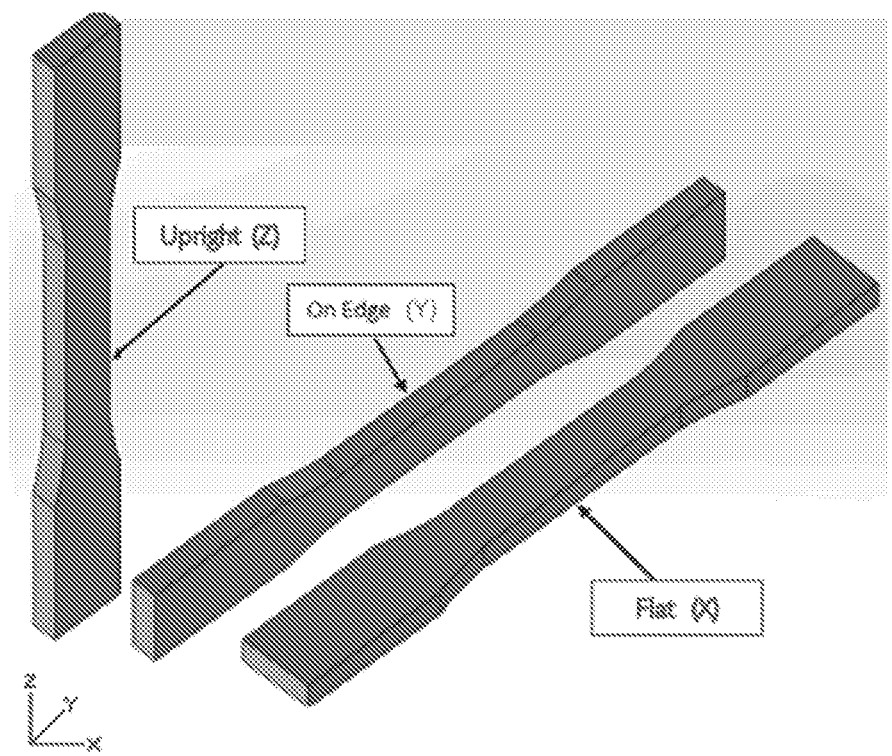

MATERIAL AND METHOD FOR POWDER BED FUSION

CROSS-REFERENCE TO RELATED APPLICATIONS

This application is a National Stage application of PCT/US2020/044018, filed Jul. 29, 2020, which claims the benefit of U.S. Provisional Application No. 62/880,722, filed Jul. 31, 2019, both of which are incorporated by reference herein in their entirety.

BACKGROUND OF THE INVENTION

Three-dimensional printing technologies such as powder bed fusion allow the fabrication of articles with complex designs and reduced weight. However, such printed articles can exhibit lower dimensional accuracy and poorer mechanical properties than corresponding articles formed by injection molding. There is therefore a need for three-dimensional printing materials and methods that provide improved dimensional accuracy and mechanical properties.

BRIEF SUMMARY OF EMBODIMENTS OF THE INVENTION

One embodiment is a particulate material for powder bed fusion, wherein the particulate material comprises, based on the total weight of the particulate material, 98 to 100 weight percent of a semicrystalline thermoplastic selected from the group consisting of semicrystalline polycarbonates and semicrystalline polyetherimides; wherein the particulate material comprises particles characterized by a volume-based distribution of equivalent spherical diameters determined by laser diffraction according to ISO 13320:2009, and the distribution exhibits a Dv50 value in a range of 35 to 85 micrometers, wherein Dv50 is defined as the median equivalent spherical diameter, a Dv01 value greater than 2 micrometers, wherein Dv01 is defined as the equivalent spherical diameter corresponding to 1 percent of the cumulative undersize distribution, a Dv99 value less than 115 micrometers, wherein Dv99 is defined as the equivalent spherical diameter corresponding to 99 percent of the cumulative undersize distribution.

Another embodiment is a method of additive manufacturing, the method comprising: depositing a first layer comprising the above particulate material at a working area: irradiating the working area with first radiation effective to heat the first layer to a temperature below and within 10° C. of a melting onset temperature of the semicrystalline thermoplastic; and selectively irradiating a portion of the working area with second radiation effective to heat the first layer to a temperature above a melting point of the semicrystalline thermoplastic.

These and other embodiments are described in detail below.

BRIEF DESCRIPTION OF THE DRAWING

The FIGURE illustrates print orientations for test specimens.

DETAILED DESCRIPTION OF THE INVENTION

The present inventors have determined that improved dimensional accuracy and mechanical properties are provided by powder bed fusion materials and methods that utilize a particular composition and narrow particle size distribution. The particle size distribution enables enhanced powder flow characteristics and laser absorption, which in turn provide printed articles with improved dimensional accuracy and mechanical properties. Thus, one embodiment is a particulate material for powder bed fusion, wherein the particulate material comprises, based on the total weight of the particulate material, 98 to 100 weight percent of a semicrystalline thermoplastic selected from the group consisting of semicrystalline polycarbonates and semicrystalline polyetherimides; wherein the particulate material comprises particles characterized by a volume-based distribution of equivalent spherical diameters determined by laser diffraction according to ISO 13320:2009, and the distribution exhibits a Dv50 value in a range of 35 to 85 micrometers, wherein Dv50 is defined as the median equivalent spherical diameter, a Dv01 value greater than 2 micrometers, wherein Dv01 is defined as the equivalent spherical diameter corresponding to 1 percent of the cumulative undersize distribution, and a Dv99 value less than 115 micrometers, wherein Dv99 is defined as the equivalent spherical diameter corresponding to 99 percent of the cumulative undersize distribution.

As used herein, the term "semicrystalline thermoplastic" means a thermoplastic having at least 1 percent crystallinity, as determined by differential scanning calorimetry. In some embodiments, the semicrystalline thermoplastic has 1 to 50 percent crystallinity, or 5 to 50 percent crystallinity, or 10 to 50 percent crystallinity. In other embodiments, the semicrystalline thermoplastic has 5 to 40 percent crystallinity, or 5 to 30 percent crystallinity.

The semicrystalline thermoplastic can be a semicrystalline polycarbonate. Polycarbonates are polymers comprising carbonate units have the structure

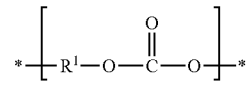

wherein at least 60 percent of the total number of $R^1$ groups are aromatic divalent groups. In some embodiments, the aromatic divalent groups are $C_6$-$C_{24}$ aromatic divalent groups. When not all $R^1$ groups are aromatic, the remainder are $C_2$-$C_{24}$ aliphatic divalent groups. In some embodiments, each $R^1$ is a radical of the formula

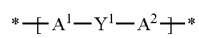

wherein each of $A^1$ and $A^2$ is independently a monocyclic divalent aryl radical and $Y^1$ is a bridging radical in which one or two atoms separate $A^1$ from $A^2$. Examples of $A^1$ and $A^2$ include 1,3-phenylene and 1,4-phenylene, each optionally substituted with one, two, or three $C_1$-$C_6$ alkyl groups. In some embodiments, one atom separates $A^1$ from $A^2$. Examples of $Y^1$ an: —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. In some embodiments, $Y^1$ is a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen, unless it is specifically identified as "substituted hydrocarbyl". The hydrocarbyl residue can be aliphatic or aromatic, straight-chain or cyclic or branched, and saturated or unsaturated. It can also contain combinations of aliphatic, aromatic, straight chain, cyclic, branched, saturated, and unsaturated hydrocarbon moieties. When the hydrocarbyl residue is described as substituted, it includes one or more substituents such as, for example, halogen (i.e., F, Cl, Br, I), hydroxyl, amino, thiol, carboxyl, carboxylate, amide, nitrile, sulfide, disulfide, nitro. $C_1$-$C_{18}$ alkyl, $C_1$-$C_{18}$ alkoxyl, $C_6$-$C_{18}$ aryl, $C_6$-$C_{18}$ aryloxyl, $C_7$-$C_{18}$ alkylaryl, or $C_7$-$C_{18}$ alkylaryloxyl. So, when the hydrocarbyl residue is described as substituted, it can contain heteroatoms in addition to carbon and hydrogen. Examples of $Y^1$ include methylene (—$CH_2$—: also known as methylidene), ethylidene (—$CH(CH_3)$—), isopropylidene (—$C(CH_3)_2$—), and cyclohexylidene. In some embodiments, the divalent carbonate unit is free of alkoxyl substituents.

In some embodiments, the semicrystalline polycarbonate comprises semicrystalline bisphenol A polycarbonate. In some embodiments, the semicrystalline polycarbonate comprises a semicrystalline copolycarbonate comprising, based on 100 mole percent total carbonate units, 40 to 90 mole percent bisphenol A carbonate units and 10 to 60 mole percent of 3,3-bis(4-hydroxyphenyl)phthalimidine carbonate units of the formula

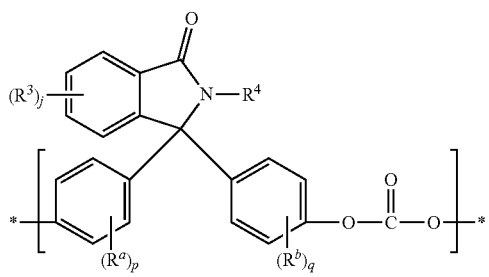

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4. As used herein, the term "alkyl" includes linear, branched, cyclic, and polycyclic alkyl groups, as well as alkyl groups having a combination of at least two types of linear, branched, cyclic, and polycyclic alkyl fragments. These copolycarbonates can be prepared by methods known in the art, including those described in U.S. Pat. No. 5,344,910 to Sybert, issued 6 Sep. 1994; U.S. Patent Application Publication Number US 2019/0143582 A1 of Hungerland et al., published 16 May 2019; and International Patent Application Publication Number WO 2015/048735 A1 of Mahood et al., published 2 Apr. 2015.

In some embodiments, the semicrystalline polycarbonate comprises a semicrystalline copolycarbonate comprising, based on 100 mole percent total carbonate units, 40 to 90 mole percent bisphenol A carbonate units and 10 to 60 mole percent of bis(phenoxy)isophorone carbonate units of the formula

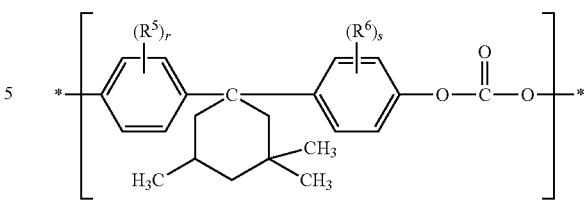

wherein $R^5$ and $R^6$ are independently at each occurrence $C_1$-$C_{12}$ alkyl, $C_2$-$C_{12}$ alkenyl, or $C_1$-$C_{12}$ alkoxyl; and r and s are each independently 0, 1, 2, 3, or 4. In some embodiments, r and s are zero. These copolycarbonates can be prepared by methods known in the art, including those described in U.S. Patent Application Publication No. US 2019/0143582 A1 of Hungerland et al., published 16 May 2019.

There is no particular limit on the structure of end groups on the polycarbonate. Monofunctional chain terminating agents (also referred to as a chain stopping agents) can be included during polymerization to provide end groups on the polycarbonate. Examples of chain terminating agents include monocyclic phenols such as phenol, p-cyanophenol, and $C_1$-$C_{22}$ alkyl-substituted phenols such as p-cumylphenol and p-tertiary-butyl phenol; monoethers of aromatic diols, such as p-methoxyphenol; monoesters of aromatic diols, such as resorcinol monobenzoate; monochloroformates, such as phenyl chloroformate, p-cumylphenyl chloroformate, and p-tolyl chloroformate. Combinations of different end groups can be used. In some embodiments, the polycarbonate has a weight average molecular weight of 15,000 to 50.000 grams/mole, determined by gel permeation chromatography using bisphenol A polycarbonate standards. Within this range, the weight average molecular weight can be 20,000 to 40,000 grams/mole.

Methods of crystallizing polycarbonates (i.e., forming semicrystalline polycarbonates from amorphous polycarbonates) include those described in U.S. Pat. No. 7,084,232 B2 to Kim et al., issued 1 Aug. 2006; U.S. Patent Application Publication Number US 2018/0178413 A1 of Kalyanaraman et al., published 28 Jun. 2018; and U.S. Patent Application Publication Number US 2018/0244863 A 1 of Leenders, published 30 Aug. 2018.

The semicrystalline thermoplastic can be a semicrystalline polyetherimide. The semicrystalline polyetherimide comprises etherimide units having the formula

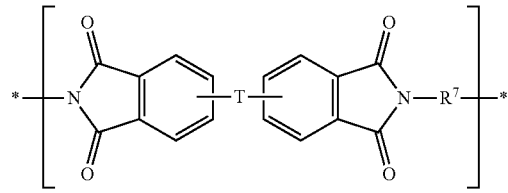

wherein T is —O— or a group of the Formula —O—Z—O— wherein the divalent bonds of the —O— or the —O—Z—O— group are in the 3,3', 3,4', 4,3', or the 4,4' positions of the phthalimide groups; Z includes divalent moieties of the formula

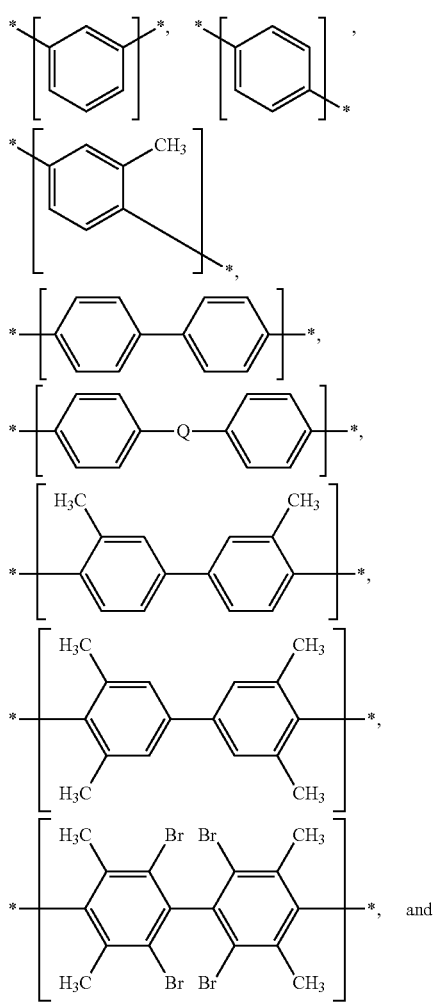

wherein Q is a divalent moiety that can be —O—, —S—, —C(O)—, —SO$_2$—, —SO—, —C$_y$H$_{2y}$— wherein y is 1 to 8, or —C$_p$H$_q$F$_r$ wherein p is 1 to 8 and q is 0 to 15 and r is 1 to 16 and q+r=2p; and R$^7$ is independently at each occurrence a divalent group selected from the group consisting of substituted or unsubstituted divalent aromatic hydrocarbon moieties having 6 to 20 carbons, straight or branched chain alkylene moieties having 2 to 20 carbons, cycloalkylene moieties having 3 to 20 carbon atom, and divalent moieties of the general formula wherein Q is defined above. As used herein, "substituted" means including at least one substituent such as a halogen (i.e., F, Cl, Br, I), hydroxyl, amino, thiol, carboxyl, carboxylate, amide, nitrile, sulfide, disulfide, nitro, C$_1$-C$_{18}$ alkyl, C$_1$-C$_{18}$ alkoxyl, C$_6$-C$_{18}$ aryl, C$_6$-C$_{18}$ aryloxyl, C$_7$-C$_{18}$ alkylaryl, or C$_7$-C$_{18}$ alkylaryloxyl. So, when the hydrocarbyl residue is described as substituted, it can contain heteroatoms in addition to carbon and hydrogen. In some embodiments, the polyetherimide comprises etherimide units having the structure wherein R$^8$ is meta-phenylene or para-phenylene. In some embodiments, the polyetherimide is free of halogens. The number of etherimide units in the polyetherimide can be, for example, 10 to 1,000, or 20 to 500. In some embodiments, the semicrystalline polyetherimide comprises at least 90 weight percent of etherimide units having the structure Included among methods of synthesizing polyetherimides are those described in U.S. Pat. No. 3,847,867 to Heath et al., U.S. Pat. No. 3,850,885 to Takekoshi et al., U.S. Pat. Nos. 3,852,242 and 3,855,178 to White, U.S. Pat. No. 3,983,093 to Williams et al., and U.S. Pat. No. 4,443,591 to Schmidt et al. Polyetherimides are also commercially available as, for example, ULTEM™ resins from SABIC.

Methods of crystallizing polyetherimides (i.e., forming semicrystalline polyetherimides from amorphous polyetherimides) include those described in U.S. Patent Application Publication Number US 2018/0178413 A 1 of Kalyanaraman et al., published 28 Jun. 2018: International Patent Application Publication Number WO 2018/119409 A 1 of Price et al., published 28 Jun. 2018; and A. J. Hsieh, C. R. Desper, and N. S. Schneider, "Transient crystallization of an aromatic polyetherimide: effect of annealing," *Polymer.* 1992, volume 33, number 2, pages 306-313.

The particulate material comprises the semicrystalline thermoplastic in an amount of 98 to 100 weight percent, based on the total weight of the particulate material. Within this range, the amount of the semicrystalline thermoplastic can be 99 to 100 weight percent. The particulate material can, optionally, include up to 2 weight percent, or up to 1 weight percent, based on the total weight of the particulate material, of an additive selected from the group consisting of stabilizers, antioxidants, processing aids, UV blockers, dyes, pigments, anti-static agents, metal deactivators, flow-promoting agents, and combinations thereof. Flow-promoting agents include, for example, metal oxides, mixed metal oxides, and combinations thereof. Specific flow-promoting agents include fumed silica, hydrated silica, glassy silica, fumed alumina, amorphous alumina, titania, and combinations thereof. In some embodiments, the flow-promoting agent comprises fumed silica.

The particulate material comprises particles characterized by a volume-based distribution of equivalent spherical diameters determined by laser diffraction according to ISO 13320:2009. Mastersizer™ particle size analyzers from Malvern Instruments are suitable laser diffraction instruments for determining particle size characteristics according to ISO 13320:2009. The volume-based distribution of equivalent spherical diameters exhibits a Dv50 value in a range of 35 to 85 micrometers, wherein Dv50 is defined as the median equivalent spherical diameter, which is also the equivalent spherical diameter corresponding to 50. In some embodiments, the Dv50 value is in a range of 40 to 80 micrometers, or 45 to 75 micrometers.

The volume-based distribution of equivalent spherical diameters further exhibits a Dv01 value greater than 2 micrometers, wherein Dv01 is defined as the equivalent spherical diameter corresponding to 1 percent of the cumulative undersize distribution. In other words, Dv01 is the equivalent spherical diameter such that 1 percent of the particles have a lesser or equal equivalent spherical diameter. In some embodiments, the Dv01 value is in a range of 2 to 10 micrometers.

The volume-based distribution of equivalent spherical diameters further exhibits a Dv99 value less than 115 micrometers, wherein Dv99 is defined as the equivalent spherical diameter corresponding to 99 percent of the cumulative undersize distribution. In other words, Dv99 is the equivalent spherical diameter such that 99 percent of the particles have a lesser or equal equivalent spherical diameter. In some embodiments, the Dv99 value is in a range of 100 to 115 micrometers, or 105 to 115 micrometers.

In some embodiments of the particulate material, the volume-based distribution of equivalent spherical diameters exhibits a Dv10 value in a range of 30 to 50 micrometers, and a Dv90 value in a range of 80 to 100 micrometers; wherein Dv10 is defined as the equivalent spherical diameter corresponding to 10 percent of the cumulative undersize distribution (in other words, the equivalent spherical diameter such that 10 percent of the particles have a greater or equal equivalent spherical diameter), and Dv90 is defined as the equivalent spherical diameter corresponding to 90 percent of the cumulative undersize distribution (in other words the equivalent spherical diameter such that 90 percent of the particles have a lesser or equal equivalent spherical diameter).

In some embodiments of the particulate material, the particles exhibit a sphericity of at least 80 percent, determined according to ISO 9276-6:2008. Within this limit the sphericity can be in a range of 80 to 100 percent, or 80 to 95 percent.

In some embodiments of the particulate material, the particles exhibit a Hausner Ratio in a range of 1.0 to 1.18, determined according to ISO 3953:2011. Within this range, the Hausner Ratio can be in a range of 1.0 to 1.15, or 1.0 to 1.1.

In some embodiments of the particulate material, the volume-based distribution of equivalent spherical diameters is monomodal. In this context, monomodal means that the distribution has only one local maximum.

In some embodiments, the particulate material is prepared starting from pellets of amorphous or semicrystalline thermoplastic. In either case, the pellets are ground to yield an intermediate particulate material having a broader particle size distribution than the present particulate material. Suitable grinding techniques include grinding under ambient conditions, cryogenic grinding, microspinning followed by cutting, and combinations thereof. In some embodiments, grinding comprises cryogenic grinding at −20° C.

If the particulate material is prepared from pellets of amorphous thermoplastic, the intermediate particulate material can be subject to crystallization. Methods of crystallizing particulate thermoplastics are known and include those cited above in the context of polycarbonates and polyetherimides.

The intermediate particulate material or its crystallized product is subjected to particle size selection in order to prepare the present particulate material having the narrow particle size distribution described herein. Suitable particle size selection techniques include sieving, fluid stream particle separation, and combinations thereof. In sieving, a mesh screen having a precise and uniform pore size is used to selectively remove particles greater than the pore size. In some embodiments, the sieve has a pore size in a range of 83 to exclude particles above and below the desired particle size. For example, a first sieve having a pore size in the range 100 to 110 micrometers can be used to exclude larger particles, and a second sieve having a pore size in the range 83 to 93 micrometers can be used to exclude smaller particles. Within the range of 100 to 110 micrometers, the first sieve pore size can be 102 to 108 micrometers, or 104 to 106 micrometers, or 105 micrometers. Within the range of 83 to 93 micrometers, the second sieve pore size can be 85 to 91 micrometers, or 87 to 89 micrometers, or 88 micrometers. In fluid stream particle separation, a particulate material is suspended in a first, less dense fluid, and the resulting suspension is flowed over the upper surface of multiple chambers containing a second, more dense fluid, resulting in size-selective deposition of particles in the multiple chambers. Fluid stream particle separation is described, for example, in U.S. Pat. No. 386,504 to Sweanor, issued 24 Jul.

1888; United Kingdom Patent Application Publication Number GB 2 258 173 A of Takada, published 3 Feb. 1993; and International Patent Application Publication Number WO 2018/129527 A2 of Price, published 12 Jul. 2018.

In some embodiments, forming the particulate material comprises grinding an amorphous thermoplastic, conducting a first particle size selection, at least partially crystallizing the amorphous thermoplastic, and conducting a second particle size selection.

Another embodiment is a method of additive manufacturing, the method comprising: depositing at a working area a first layer comprising the particulate material in any of its above-described variations; irradiating the working area with first radiation effective to heat the first layer to a temperature below and within 10° C. of a melting onset temperature of the semicrystalline thermoplastic; and selectively irradiating a portion of the working area with second radiation effective to heat the first layer to a temperature above a melting point of the semicrystalline thermoplastic.

The method comprises depositing a first layer comprising the particulate material at a working area. The particulate material can have any of the above-described variations in composition, crystallinity, and particle size. Particle deposition methods and devices are known for various additive manufacturing processes. For example, in selective laser sintering, a building area is located near one or more powder delivery modules. The building area may be a moveable stage or other platform disposed within a cylinder or other volume. A powder delivery module may likewise comprise a moveable stage or other platform disposed within a cylinder or other volume. In operation, a powder delivery platform is advanced so as to raise up an amount of powder above the top of the cylinder in which the powder delivery platform is disposed. A roller or other modality can then move (e.g., via sweeping or other motion) the powder that was advanced by the platform and then move that powder into the building area.

After the first layer comprising the particulate material is deposited at the working area, the working area is irradiated with first radiation effective to heat the first layer to a temperature below and within 10° C. of the melting onset temperature of the semicrystalline thermoplastic. In some embodiments, the first layer is heated to a temperature below and within 5° C. of the melting onset temperature of the semicrystalline thermoplastic. The melting onset temperature of the semicrystalline thermoplastic can be determined according to ASTM D3418-15 by differential scanning calorimetry using a heating rate of 20° C./minute. The first radiation can be, for example, infrared radiation generated by a laser.

After the first layer has been irradiated with first radiation and heated to a temperature below and within 10° C. of the melting onset temperature of the semicrystalline thermoplastic, a portion of the working area is selectively irradiated with second radiation effective to heat the first layer to a temperature above a melting point of the semicrystalline thermoplastic. This second irradiation step causes the particulate material to melt and fuse, thereby forming a molten thermoplastic that, in some embodiments, has a zero-shear viscosity in a range of 10 to $10^4$ Pascal-second. The second radiation can be, for example, infrared radiation generated by a laser. In some embodiments, the second radiation comprises laser radiation at a wavelength of 10.6 micrometers.

The depositing step and the two irradiating steps can be repeated to effect layer-wise build-up of the additively manufactured article. For example, after the working area with the first layer has been irradiated with the second radiation, a second layer comprising the particulate material can be deposited at the working area, irradiated with the first radiation, and irradiated with the second irradiation.

In some embodiments of the method, the particles exhibit a sphericity of at least 80 percent, determined according to ISO 9276-6:2008. Within this limit the sphericity can be in a range of 80 to 100 percent, or 80 to 95 percent.

In some embodiments of the method, the particles exhibit a Hausner Ratio in a range of 1.0 to 1.18, determined according to ISO 3953:2011. Within this range, the Hausner Ratio can be in a range of 1.0 to 1.15, or 1.0 to 1.1.

In some embodiments of the method, the semicrystalline thermoplastic is a semicrystalline polycarbonate. In some embodiments, the semicrystalline polycarbonate comprises a semicrystalline bisphenol A polycarbonate. In some embodiments, the semicrystalline polycarbonate comprises a semicrystalline copolycarbonate comprising, based on 100 mole percent total carbonate units, 40 to 90 mole percent bisphenol A carbonate units and 10 to 60 mole percent of 3,3-bis(4-hydroxyphenyl)phthalimidine carbonate units of the formula

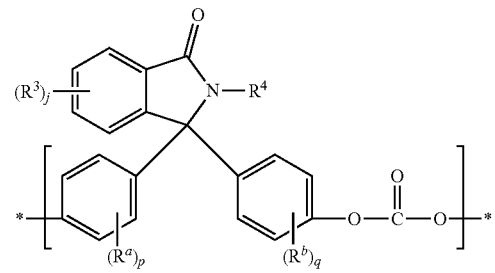

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4. In some embodiments, the semicrystalline polycarbonate comprises a semicrystalline copolycarbonate comprising, based on 100 mole percent total carbonate units, 40 to 90 mole percent bisphenol A carbonate units and 10 to 60 mole percent of bis(phenoxy) isophorone carbonate units of the formula

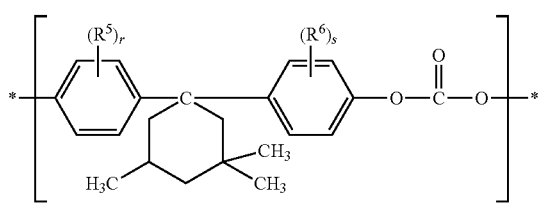

wherein $R^5$ and $R^6$ are independently at each occurrence $C_1$-$C_{12}$ alkyl, $C_2$-$C_{12}$ alkenyl, or $C_1$-$C_{12}$ alkoxyl; and r and s are each independently 0, 1, 2, 3, or 4.

In some embodiments of the method, the semicrystalline thermoplastic is a semicrystalline polyetherimide. In some embodiments, the semicrystalline polyetherimide comprises at least 90 weight percent of etherimide units having the structure

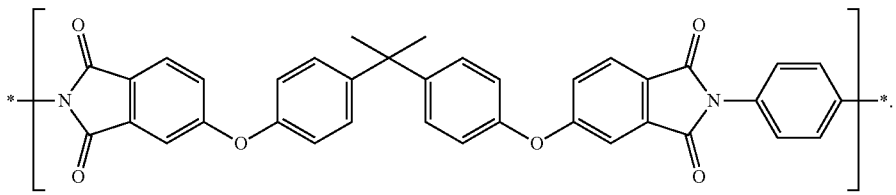

All ranges disclosed herein are inclusive of the endpoints, and the endpoints are independently combinable with each other. Each range disclosed herein constitutes a disclosure of any point or sub-range lying within the disclosed range.

The invention includes at least the following aspects.

Aspect 1: A particulate material for powder bed fusion, wherein the particulate material comprises, based on the total weight of the particulate material, 98 to 100 weight percent of a semicrystalline thermoplastic selected from the group consisting of semicrystalline polycarbonates and semicrystalline polyetherimides; wherein the particulate material comprises particles characterized by a volume-based distribution of equivalent spherical diameters determined by laser diffraction according to ISO 13320:2009, and the distribution exhibits a Dv50 value in a range of 35 to 85 micrometers, wherein Dv50 is defined as the median equivalent spherical diameter, a Dv01 value greater than 2 micrometers, wherein Dv01 is defined as the equivalent spherical diameter corresponding to 1 percent of the cumulative undersize distribution, a Dv99 value less than 115 micrometers, wherein Dv99 is defined as the equivalent spherical diameter corresponding to 99 percent of the cumulative undersize distribution.

Aspect 2: The particulate material of aspect 1, wherein the volume-based distribution of equivalent spherical diameters exhibits a Dv10 value in a range of 30 to 50 micrometers, and a Dv90 value in a range of 80 to 100 micrometers; wherein Dv10 is defined as the equivalent spherical diameter corresponding to 10 percent of the cumulative undersize distribution, and Dv90 is defined as the equivalent spherical diameter corresponding to 90 percent of the cumulative undersize distribution.

Aspect 3: The particulate material of aspect 1 or 2, wherein the volume-based distribution of equivalent spherical diameters is monomodal.

Aspect 4: The particulate material of any one of aspects 1-3, wherein the particles exhibit a sphericity of at least 80 percent, determined according to ISO 9276-6:2008.

Aspect 5: The particulate material of any one of aspects 14, wherein the particles exhibit a Hausner Ratio in a range of 1.0 to 1.18, determined according to ISO 3953:2011.

Aspect 6: The particulate material of any one of aspects 1-5, wherein the semicrystalline thermoplastic is a semicrystalline polycarbonate.

Aspect 7: The particulate material of aspect 6, wherein the semicrystalline polycarbonate comprises a semicrystalline bisphenol A polycarbonate.

Aspect 8: The particulate material of any one of aspects 1-5, wherein the semicrystalline thermoplastic resin is a semicrystalline polyetherimide.

Aspect 9: The particulate material of aspect 8, wherein the semicrystalline polyetherimide comprises at least 90 weight percent of etherimide units having the structure

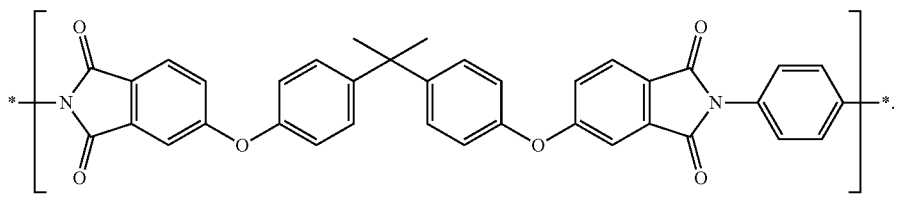

Aspect 10: A method of additive manufacturing, the method comprising: depositing a first layer comprising the particulate material of any one of aspects 1-9 at a working area: irradiating the working area with first radiation effective to heat the first layer to a temperature below and within 10° C. of a melting onset temperature of the semicrystalline thermoplastic; and selectively irradiating a portion of the working area with second radiation effective to heat the first layer to a temperature above a melting point of the semicrystalline thermoplastic.

Aspect 11: The method of aspect 10, wherein the volume-based distribution of equivalent spherical diameters exhibits a Dv10 value in a range of 30 to 50 micrometers, and a Dv90 value in a range of 80 to 100 micrometers, wherein Dv10 is defined as the equivalent spherical diameter corresponding to 10 percent of the cumulative undersize distribution, and Dv90 is defined as the equivalent spherical diameter corresponding to 90 percent of the cumulative undersize distribution.

Aspect 12: The method of aspect 10 or 11, wherein the particles exhibit a sphericity of at least 80 percent, determined according to ISO 9276-6:2008.

Aspect 13: The method of any one of aspects 10-12, wherein the particles exhibit a Hausner Ratio in a range of 1.0 to 1.18, determined according to ISO 3953:2011.

Aspect 14: The method of any one of aspects 10-13, wherein the semicrystalline thermoplastic is a semicrystalline polycarbonate.

Aspect 15: The method of any one of aspects 10-13, wherein the semicrystalline thermoplastic is a semicrystalline polyetherimide.

The invention is further illustrated by the following non-limiting examples.

Examples

The starting material for these examples was a pelletized amorphous para-cumylphenol endcapped bisphenol A polycarbonate having a weight average molecular weight of 17,000-40,000 grams/mole determined by gel permeation chromatography using bisphenol A polycarbonate standards.

To prepare the inventive material designated Example 1 in Table 1, pellets of the polycarbonate starting material were converted to a first intermediate particulate material by cryogenic grinding at −20° C. followed by sieving with a 140 mesh sieve (pore size=105 micrometers) to remove large particles. The first intermediate particulate material was subjected to solvent-induced crystallization to yield a second intermediate particulate material. The crystallization conditions were 1 part by weight of the first intermediate particulate material, 1.77 parts by weight methanol, and 5.35 parts by weight acetone, with stirring for 5-6 hours at 25° C. under nitrogen, followed by filtration of solids over a 10 micrometer filter, and drying of the filtered solids under vacuum at 100° C. for sufficient time to achieve a residual acetone content less than 100 parts per million by weight and a residual methanol content less than 10 parts per million by weight. The resulting second intermediate particulate material was combined with 0.05 weight percent of a fumed silica flow promoter (hydrophilic fumed silica, having a BET surface area of 200±25 meter$^2$/gram; obtained as AEROSIL™ 200 from Evonik) and 0.05 weight percent of antistatic additive (tetra-n-butylphosphonium perfluorobutanesulfonate, CAS Reg. No. 108427-52-7; obtained as FC-a from Hunan Chemical BV), to yield a third intermediate particulate material, which was sieved with a 140 mesh sieve (pore size=105 micrometers) then a 170 mesh (pore size=88 micrometers) sieve to yield the final particulate material designated Example 1 in Table 1.

To prepare the comparative material designated Comparative Example 1 in Table 1, the same procedure was used, except that the first sieving (following cryogenic grinding) used a 120 mesh sieve (pore size=125 micrometers), and the final sieving (following mixing with fumed silica and antistatic additive) consisted of sieving with a 120 mesh sieve (pore size=125 micrometers).

For each particulate material, Dv01, Dv50, and Dv99 values were determined by laser diffraction according to ISO 13320:2009, using a Mastersizer™ particle size analyzer from Malvern Instruments. The same analysis also yielded the percent of particles smaller than 1 micrometer ("<1 μm (%)" in Table 1), and the percent of particles larger than 120 micrometers (">120 μm (%)" in Table 1), as well as the sphericity determined according to ISO 9276-6:2008. Results are presented in Table 1.

TABLE 1

|  | C. Ex. 1 | Ex. 1 |
|---|---|---|
| Dv01 (μm) | 0.8 | 3.2 |
| Dv50 (μm) | 81 | 64 |
| Dv99 (μm) | 132 | 112 |
| <1 μm (%) | 1.16 | 0 |
| >120 (μm) (%) | 2.7 | 0.1 |
| sphericity (%) | 85 | 85 |

A dimension control test was conducted to determine how the Example 1 and Comparative Example 1 particulate materials affected the dimensional accuracy of a thin (target thickness=3.2 millimeters) section of an article printed by selective laser sintering. The printed article was a rectangular test specimens of dimension 63.5 millimeters×3.3 millimeters×12.7 millimeters (length×width×height). The test specimens were printed in three print orientations, such that the specimen's nominal 3.2 millimeter thickness was printed in the X-Direction (flat), Y-Direction (on edge), and Z-direction (upright). These orientations are illustrated in the FIGURE. For each combination of particulate material and print orientation, five test specimens were printed. The actual thicknesses of the thin section were measured using a Bochem™ 12116 digital caliper. Measured thickness values are presented in Table 2. Also presented in Table 2 are averages and standard deviations of the measured thickness values, as well as the percent variation from target thickness, which was calculated according to the equation % variation from target thickness=100×[(actual thickness)−(target thickness)]/(target thickness).

The Table 2 results show that relative to Comparative Example 1, inventive Example 1 exhibited lower sample-to-sample variability (as evidenced by lower standard deviation of measured thickness), and more accurate dimension control (as evidenced by lower percent variation from target width).

TABLE 2

|  | Example 1 | | | Comparative Example 1 | | |
|---|---|---|---|---|---|---|
|  | X-direction thickness (mm) | Y-direction thickness (mm) | Z-direction thickness (mm) | X-direction thickness (mm) | Y-direction thickness (mm) | Z-direction thickness (mm) |
|  | 3.30 | 3.67 | 3.25 | 3.69 | 3.97 | 3.69 |
|  | 3.20 | 3.69 | 3.21 | 3.48 | 4.01 | 3.55 |
|  | 3.30 | 3.63 | 3.39 | 3.33 | 3.38 | 3.45 |
|  | 3.17 | 3.37 | 3.35 | 3.69 | 4.05 | 3.58 |
|  | 3.28 | 3.64 | 3.28 | 3.38 | 4.02 | 3.50 |
| Avg. | 3.25 | 3.60 | 3.30 | 3.51 | 3.89 | 3.55 |
| Std. Dev. | 0.06 | 0.13 | 0.07 | 0.17 | 0.28 | 0.09 |
| Variation from target thickness (%) | 1.6 | 12.5 | 3.0 | 9.8 | 21.4 | 11.1 |

The invention claimed is:

1. A particulate material for powder bed fusion, wherein the particulate material comprises, based on the total weight of the particulate material, 98 to 100 weight percent of a semicrystalline thermoplastic selected from the group consisting of semicrystalline polycarbonates and semicrystalline polyetherimides;

wherein the particulate material comprises particles characterized by a volume-based distribution of equivalent spherical diameters determined by laser diffraction according to ISO 13320:2009, and the distribution exhibits
- a Dv50 value in a range of 35 to 85 micrometers, wherein Dv50 is defined as the median equivalent spherical diameter,
- a Dv01 value greater than 2 micrometers, wherein Dv01 is defined as the equivalent spherical diameter corresponding to 1 percent of the cumulative undersize distribution,
- a Dv99 value less than 115 micrometers, wherein Dv99 is defined as the equivalent spherical diameter corresponding to 99 percent of the cumulative undersize distribution.

2. The particulate material of claim 1, wherein the volume-based distribution of equivalent spherical diameters exhibits a Dv10 value in a range of 30 to 50 micrometers, and a Dv90 value in a range of 80 to 100 micrometers; wherein Dv10 is defined as the equivalent spherical diameter corresponding to 10 percent of the cumulative undersize distribution, and Dv90 is defined as the equivalent spherical diameter corresponding to 90 percent of the cumulative undersize distribution.

3. The particulate material of claim 1, wherein the volume-based distribution of equivalent spherical diameters is monomodal.

4. The particulate material of claim 1, wherein the particles exhibit a sphericity of at least 80 percent, determined according to ISO 9276-6:2008.

5. The particulate material of claim 1, wherein the particles exhibit a Hausner Ratio in a range of 1.0 to 1.18, determined according to ISO 3953:2011.

6. The particulate material of claim 1, wherein the semicrystalline thermoplastic is a semicrystalline polycarbonate.

7. The particulate material of claim 6, wherein the semicrystalline polycarbonate comprises a semicrystalline bisphenol A polycarbonate.

8. The particulate material of claim 1, wherein the semicrystalline thermoplastic resin is a semicrystalline polyetherimide.

9. The particulate material of claim 8, wherein the semicrystalline polyetherimide comprises at least 90 weight percent of etherimide units having the structure

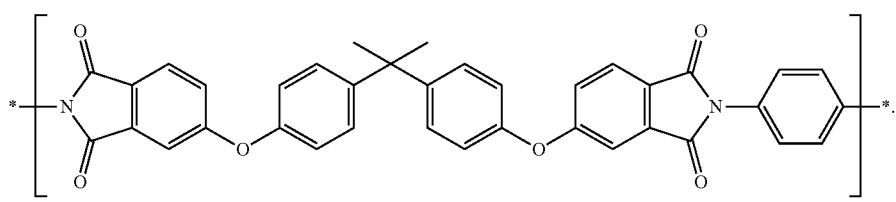

10. A method of additive manufacturing, the method comprising:
- depositing a first layer comprising the particulate material of claim 1 at a working area;
- irradiating the working area with first radiation effective to heat the first layer to a temperature below and within 10° C. of a melting onset temperature of the semicrystalline thermoplastic; and
- selectively irradiating a portion of the working area with second radiation effective to heat the first layer to a temperature above a melting point of the semicrystalline thermoplastic.

11. The method of claim 10, wherein the volume-based distribution of equivalent spherical diameters exhibits a Dv10 value in a range of 30 to 50 micrometers, and a Dv90 value in a range of 80 to 100 micrometers; wherein Dv10 is defined as the equivalent spherical diameter corresponding to 10 percent of the cumulative undersize distribution, and Dv90 is defined as the equivalent spherical diameter corresponding to 90 percent of the cumulative undersize distribution.

12. The method of claim 10, wherein the particles exhibit a sphericity of at least 80 percent, determined according to ISO 9276-6:2008.

13. The method of claim 10, wherein the particles exhibit a Hausner Ratio in a range of 1.0 to 1.18, determined according to ISO 3953:2011.

14. The method of claim 10, wherein the semicrystalline thermoplastic is a semicrystalline polycarbonate.

15. The method of claim 10, wherein the semicrystalline thermoplastic is a semicrystalline polyetherimide.

\* \* \* \* \*